(12) United States Patent
Sun

(10) Patent No.: US 11,283,970 B2
(45) Date of Patent: Mar. 22, 2022

(54) IMAGE PROCESSING METHOD, IMAGE PROCESSING APPARATUS, ELECTRONIC DEVICE, AND COMPUTER READABLE STORAGE MEDIUM

(71) Applicant: Guangdong Oppo Mobile Telecommunications Corp., Ltd., Guangdong (CN)

(72) Inventor: Jianbo Sun, Guangdong (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 0 days.

(21) Appl. No.: 16/564,986

(22) Filed: Sep. 9, 2019

(65) Prior Publication Data
US 2019/0394363 A1    Dec. 26, 2019

Related U.S. Application Data

(63) Continuation of application No. PCT/CN2017/076201, filed on Mar. 9, 2017.

(51) Int. Cl.
| | |
|---|---|
| *H04N 5/222* | (2006.01) |
| *G06K 9/46* | (2006.01) |
| *G06K 9/62* | (2006.01) |
| *H04N 5/14* | (2006.01) |
| *G06T 7/11* | (2017.01) |
| *G06T 7/194* | (2017.01) |
| *G06T 7/593* | (2017.01) |
| *G06T 17/00* | (2006.01) |

(52) U.S. Cl.
CPC .......... *H04N 5/2226* (2013.01); *G06K 9/4609* (2013.01); *G06K 9/6202* (2013.01); *H04N 5/144* (2013.01)

(58) Field of Classification Search
CPC ........ H04N 5/2226; G06T 2207/10028; G06K 9/6202
See application file for complete search history.

(56) References Cited

U.S. PATENT DOCUMENTS 9,179,062 B1    11/2015  Rivard et al.
2011/0293180 A1  12/2011  Criminisi et al.
(Continued)

FOREIGN PATENT DOCUMENTS

CN    104519259 A    4/2015
CN    105791796 A    7/2016
(Continued)

OTHER PUBLICATIONS

ISR for PCT/CN2017/076201 with English translation dated Dec. 22, 2017.
(Continued)

*Primary Examiner* — Christopher K Peterson
(74) *Attorney, Agent, or Firm* — Young Basile Hanlon & MacFarlane, P.C.

(57) ABSTRACT

A method for image processing, an electronic device, and a computer readable storage medium are provided. A first cached image is acquired by capturing a current scene through an imaging apparatus of an electronic device. The method includes: acquiring depth information of the current scene; and acquiring a foreground portion of the first cached image based on the depth information.

12 Claims, 17 Drawing Sheets

(56) References Cited

U.S. PATENT DOCUMENTS

2014/0267618 A1* 9/2014 Esteban ............... H04N 13/271
                                                      348/46
2018/0130210 A1* 5/2018 Hall .................... H04N 5/2328

FOREIGN PATENT DOCUMENTS

| CN | 105160650 B | 8/2016 |
|----|-------------|--------|
| CN | 106131418 A | 11/2016 |
| EP | 2570962 A1 | 3/2013 |
| JP | 2015041279 A | 3/2015 |

OTHER PUBLICATIONS

OA for EP application 17900180.5 dated Dec. 9, 2019.
Background foreground segmentation with RGB-D Kinect data:An efficient combination of classifiers; J. Vis Commun Image R; 122-136; 2014.
Detecting objects using color and depth segmentation with Kinect sensor; SciVerse ScienceDirect; Jose-Juan Hernandez-Lopez; 196-204; 2012.
Real-time Foreground Segmentation via Range and Color Imaging; University of California at Santa Cruz, CA; Ryan Crabb; 6 pages.
Measuring Distance with Mobile Phones Using Single-Camera Stereo Vision; 2012 32nd International Conference on Distributed Computing Systems Workshops; Clemens Holzmann; 6 pages.
Multi-image matching fora general motion stereo camera model; Pattern Recognition; Ja Seong Ku; 1701-1712; 2012; 12 pages.
Indian Examination Report for IN Application 201917037394 dated Apr. 30, 2021. (8 pages).
Communication pursuant to Article 94(3) EPC for EP Application 17900180.5 dated Nov. 4, 2021. (7 pages).

\* cited by examiner first location Ol    first location Or cached main image

IMAGE PROCESSING METHOD, IMAGE PROCESSING APPARATUS, ELECTRONIC DEVICE, AND COMPUTER READABLE STORAGE MEDIUM

CROSS-REFERENCE TO RELATED APPLICATION(S)

This application is a continuation application of International Application No. PCT/CN2017/076201, filed on Mar. 9, 2017, the entire contents of which are incorporated herein by reference.

TECHNICAL FIELD

The present disclosure generally relates to the field of consumer electronic technologies, and more particularly, to an image processing method, an image processing apparatus, and an electronic device.

BACKGROUND

During image processing, when a main body of an image is not determined or cannot be determined, the main body of the processed image is not prominent accordingly. Therefore, the visual effect is poor.

SUMMARY

An image processing method is provided. A first cached image is acquired by capturing a current scene through an imaging apparatus of an electronic device; and the image processing method comprises: acquiring depth information of the current scene; and acquiring a foreground portion of the first cached image based on the depth information.

An electronic device, comprising: an imaging apparatus configured to capture a current scene to acquire a first cached image; a memory configured to store executable program codes; and a processor configured to read the executable program codes stored in the memory to execute a program corresponding to the executable program codes for performing the image processing method.

A non-transitory computer readable storage medium has stored therein instructions that, when executed by a processor of an electronic device, causes the electronic device to perform an image processing method.

Additional aspects and advantages of embodiments of the present disclosure will be given in part in the following descriptions, become apparent in part from the following descriptions, or be learned from the practice of the embodiments of the present disclosure.

BRIEF DESCRIPTION OF DRAWINGS

These and other aspects and advantages of embodiments of the present disclosure will become apparent and more readily from the following descriptions made with reference to the drawings, in which.

DETAILED DESCRIPTION

Figure 1:
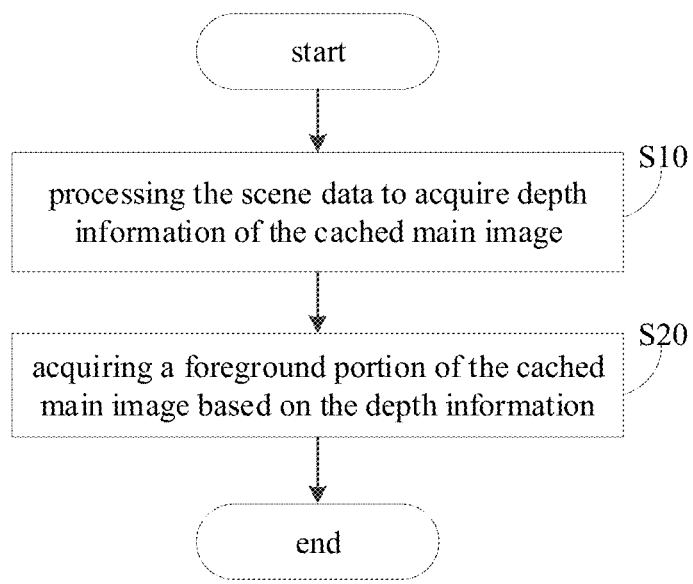
FIG. 1 is a flow chart illustrating an image processing method according to some embodiments of the present disclosure.

Reference will now be made in detail to embodiments of the present disclosure, examples of which are illustrated in the drawings. The following description refers to the drawings in which the same or similar numbers in different drawings represent the same or similar elements and the elements having same or similar functions throughout the descriptions unless otherwise represented. The embodiments described below with reference to the drawings are explanatory, and are intended to be illustrative of the present disclosure, and are not to be construed to limit the present disclosure.

Referring to FIG. 1, a depth-based image processing method, according to an embodiment of the present disclosure, is for processing scene data collected by an imaging apparatus of an electronic device. The scene data may include a cached main image. The image processing method may include acts in the following blocks.

At block S10, the scene data is processed to acquire depth information of the cached main image.

At block S20, a foreground portion of the cached main image is acquired based on the depth information.

Figure 2:
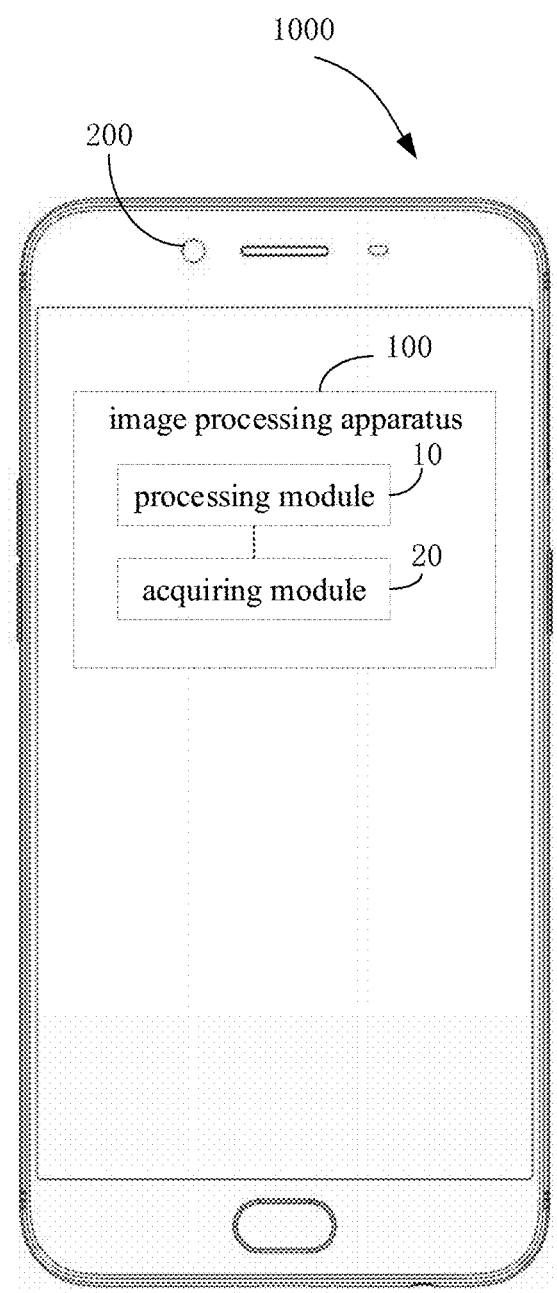
FIG. 2 is a block diagram illustrating an image processing apparatus according to some embodiments of the present disclosure.

Referring to FIG. 2, a depth-based image processing apparatus 100, according to an embodiment of the present disclosure, may include a processing module 10 and an acquiring module 20. As an example, the image processing method of the embodiment of the present disclosure may be implemented by the image processing apparatus 100 of the embodiment of the present disclosure.

With the image processing method provide in the embodiment of the present disclosure, the act in block S10 may be implemented by the processing module 10, and the act in block S20 may be implemented by the acquiring module 20. That is, the processing module 10 is configured to process the scene data to acquire depth information of the cached main image. The acquiring module 20 is configured to acquire a foreground portion of the cached main image based on the depth information.

The image processing apparatus 100 according to the embodiment of the present disclosure may be applied to the electronic device 1000 according to the embodiment of the present disclosure. That is, the electronic device 1000 according to the embodiment of the present disclosure may include the image processing apparatus 100. The electronic device 1000 according to the embodiment of the present disclosure may further include an imaging apparatus 200. The image processing apparatus 100 is electrically coupled to the imaging apparatus 200.

In some embodiments, the electronic device 1000 may include a mobile phone, a tablet computer, a notebook computer, a smart watch, a smart wristband, smart glasses, and the like, which is not limited herein.

In the daily photography process, a main body to be photographed is usually taken as the foreground portion of the image, thus the foreground portion is also an area of interest of the user, which often needs to be detected and utilized. For example, in the process of processing the image, saturation processing, exposure processing, and color enhancement may be performed on the foreground portion, thereby highlighting the main body of the image and acquiring a better visual image.

In the embodiment of the present invention, the depth information of the cached main image is acquired by processing the scene data, and the foreground portion of the cached main image is acquired based on the depth information. That is, the foreground portion of the cached main image is determined based on the depth information of the cached main image. Distances from each person and object in the scene to the imaging apparatus, may be the depth image of the cached main image. The foreground portion may be broadly understood as a person or object with a shallow depth. Therefore, the foreground portion of the cached main image may be recognized for a basis for subsequent image processing.

In conclusion, with the image processing method, the image processing apparatus 100, and the electronic device 1000 provided in the embodiments of the present disclosure, the depth information of the image is acquired by processing the scene data of the imaging apparatus 200, and the foreground portion of the image is recognized based on the depth information. The foreground portion is generally employed as the main body of the image, which provides convenience for the user to process the image and improves the user experience on one hand. On the other hand, the main body of the processed image may be more prominent, and the visual effect may be improved.

Figure 3:
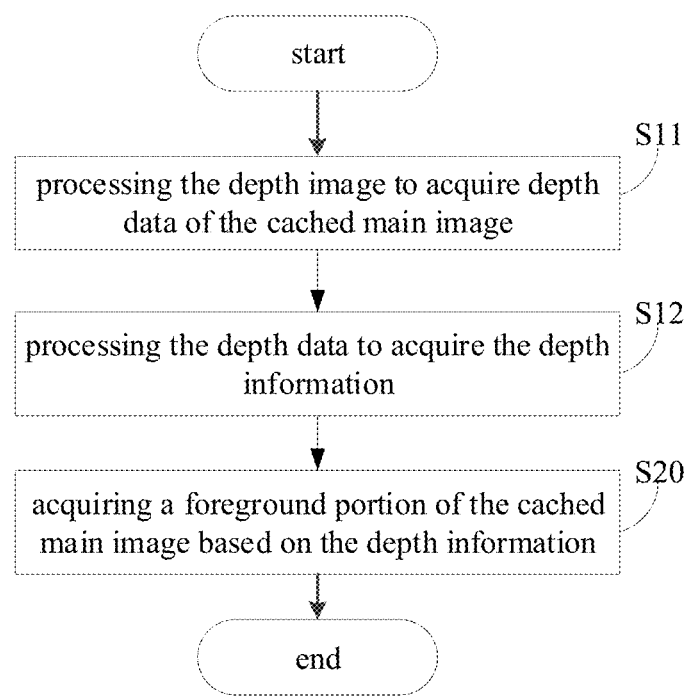
FIG. 3 is a flow chart illustrating an image processing method according to some embodiments of the present disclosure.

Referring to FIG. 3, in some embodiments, the scene data may include a depth image corresponding to the cached main image. The act in block S10 may include acts in the following blocks.

At block S11, the depth image is processed to acquire depth data of the cached main image.

At block S12, the depth data is processed to acquire the depth information.

Figure 4:
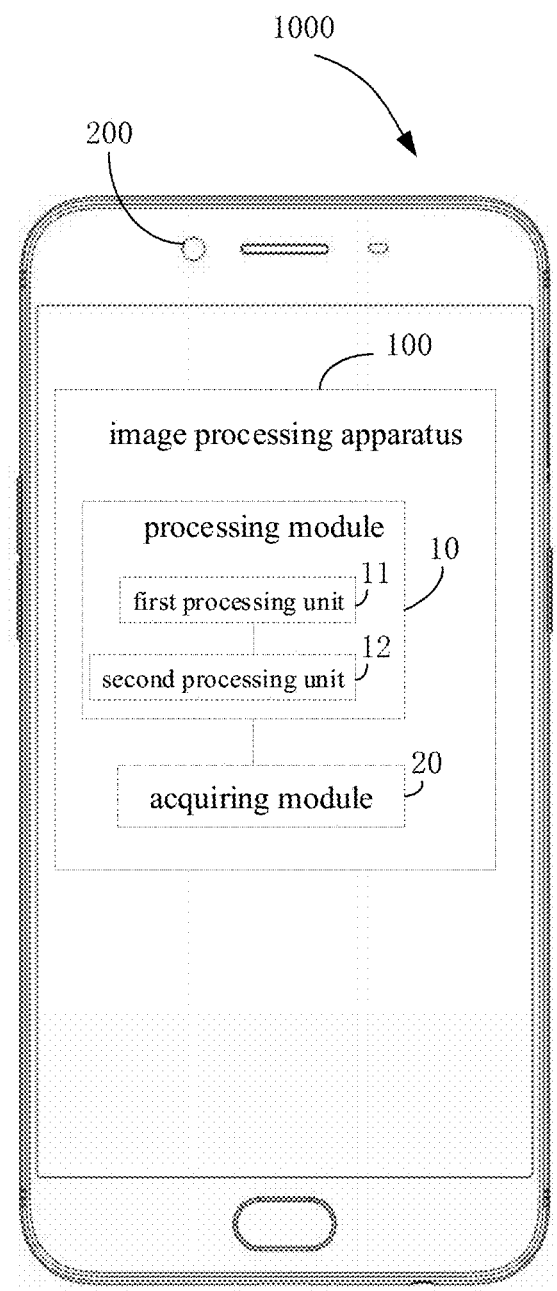
FIG. 4 is a block diagram illustrating an image processing apparatus according to some embodiments of the present disclosure.

Referring to FIG. 4, in some embodiments, the processing module 10 may include a first processing unit 11 and a second processing unit 12. The act in block S11 may be implemented by the first processing unit 11. The act in block S12 may be implemented by the second processing unit 12. That is, the first processing unit 11 is configured to process the depth image to acquire depth data of the cached main image. The second processing unit 12 is configured to process the depth data to acquire the depth information.

The scene data may include the depth image corresponding to the cached main image. The cached main image is an RGB color image. Distances from each person and object in the scene to be photographed to the imaging apparatus may be represented by the depth image. Each pixel value (i.e., depth data) in the depth image indicates a distance from a certain point in the scene to the imaging apparatus. The depth information of the corresponding person or object may be acquired based on the depth data of points of the person or object in the scene. The color information of the cached main image is in one-to-one correspondence with the depth information of the depth image. Therefore, the depth information of the cached main image may be acquired by processing the depth data of the depth image corresponding to the cached main image.

In some embodiments, the imaging apparatus 200 includes a depth camera. The depth camera may be configured to acquire the depth image. The depth camera may include a depth camera based on structured-light depth ranging, and a depth camera based on TOF (Time of Flight) ranging.

In detail, the depth camera based on structured-light depth ranging may include a camera and a projector. The projector projects structured light with a certain pattern into a scene to be photographed. A light-strip three-dimensional (3D) pattern may be formed on a surface of each person or object in the scene, which is modulated by each person or object in the scene. The light-strip 3D pattern may be detected by the camera, i.e., a light-strip two-dimensional (2D) distortion image may be acquired. A degree of distortion of strips depends on a relative position between the projector and the camera, and a surface profile or height of each person or object in the scene to be photographed. Since the relative position between the projector and the camera is constant, a 3D contour of the surface of each person or object in the scene may be reproduced based on coordinates of the light-strip 2D distortion image, thereby acquiring the depth information. The structured-light depth ranging has high resolution and measurement accuracy, which may improve the accuracy of the acquired depth information.

The depth camera based on TOF ranging is to record, by a sensor, phase changes when modulated infrared light is emitted from a light-emitting unit to an object and then reflected back from the object. In a range of wavelengths, the depth distance of the entire scene is acquired in real time based on the speed of light. The depth position of each person or object in the scene to be photographed is different, so the time from emitting the modulated infrared light to receiving the modulated infrared light is different. Therefore, the depth information of the scene may be acquired. The depth camera based on TOF ranging may calculate the depth information quickly without being affected by grays and features of the surface of the object to be photographed, which has high real-time performance.

Figure 5:
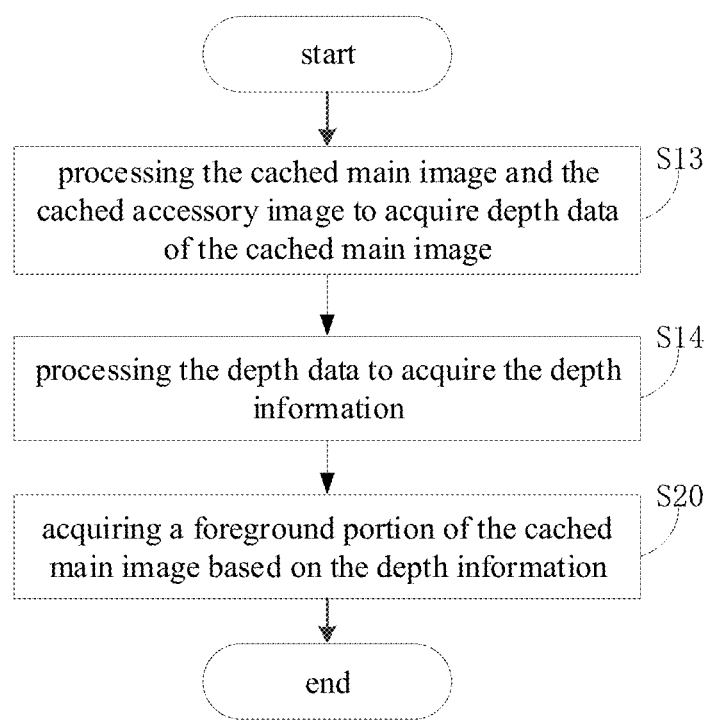
FIG. 5 is a flow chart illustrating an image processing method according to some embodiments of the present disclosure.

Referring to FIG. 5, in some embodiments, the scene data may include a cached accessory image corresponding to the cached main image. The act in block S10 may include acts in the following blocks.

At block S13, the cached main image and the cached accessory image are processed to acquire depth data of the cached main image.

At block S14, the depth data is processed to acquire the depth information.

Figure 6:
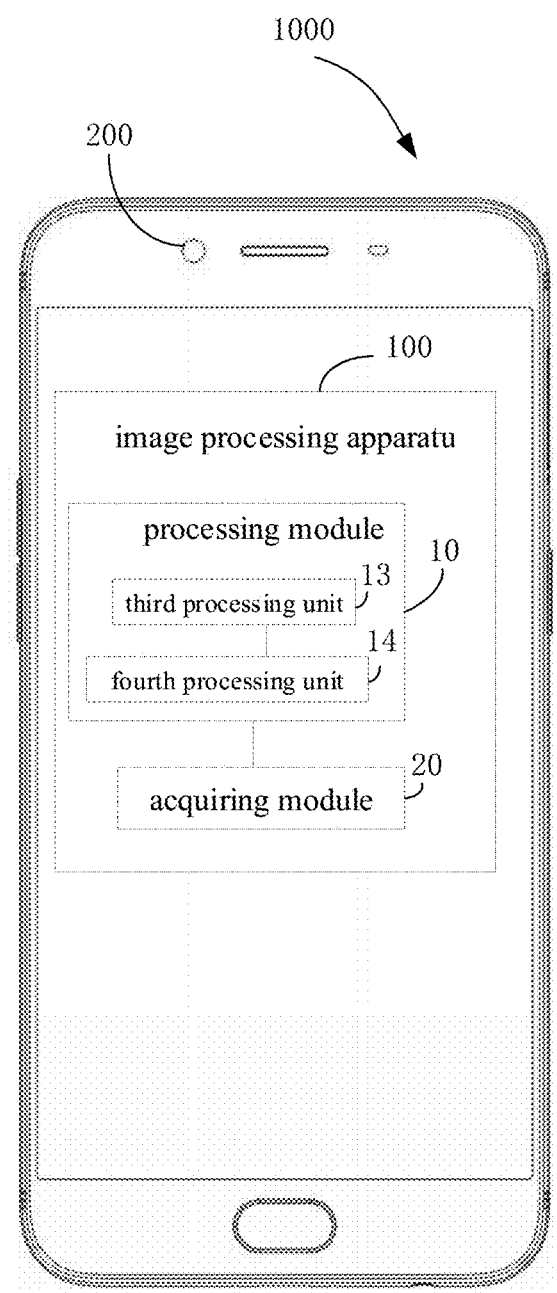
FIG. 6 is a block diagram illustrating an image processing apparatus according to some embodiments of the present disclosure.

Referring to FIG. 6, in some embodiments, the processing module 10 may include a third processing unit 13 and a fourth processing unit 14. The act in block S13 may be implemented by the third processing unit 13. The act in block S14 may be implemented by the fourth processing unit 14. That is, the third processing unit 13 is configured to process the cached main image and the cached accessory image to acquire depth data of the cached main image. The fourth processing unit 14 is configured to process the depth data to acquire the depth information.

In some embodiments, the imaging apparatus 200 may include a main camera and an accessory camera. The main camera is configured to collect the cached main image. The accessory camera is configured to collect the cached accessory image.

It should be understood that the depth information may be acquired by a binocular stereo vision ranging method. The scene data may include the scene main image and the scene accessory camera. The scene main image is captured by the main camera. The scene accessory camera is captured by the accessory camera. The scene main image and the scene accessory image are both RGB color images. Binocular stereo vision ranging is to employ two cameras of the same specification to capture from different positions to acquire a stereo image pair, match corresponding pixel points in the stereo image pair via an algorithm to calculate a parallax, and restore depth information by the triangulation method. In this way, the depth data of the cached main image may be acquired by matching the stereo image pair of the scene main image and the scene accessory image. Subsequently, the depth data is processed to acquire the depth information.

Figure 7:
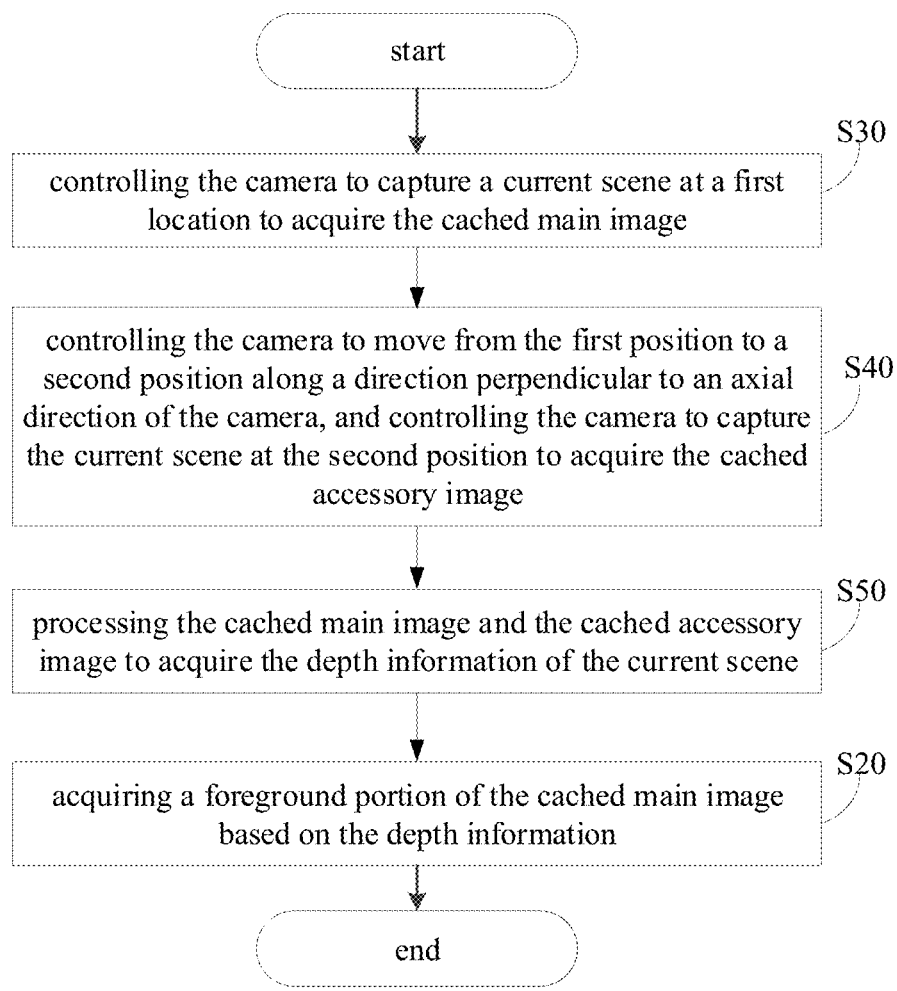
FIG. 7 is a flow chart illustrating an image processing method according to some embodiments of the present disclosure.

Referring to FIG. 7, in some embodiments, the imaging apparatus may include a single camera. The image processing method may include acts in the following blocks.

At block S30, the camera is controlled to capture a current scene at a first location to acquire the cached main image.

At block S40, the camera is controlled to move from the first position to a second position along a direction perpendicular to an axial direction of the camera, and the camera is controlled to capture the current scene at the second position to acquire the cached accessory image.

At block S50, the cached main image and the cached accessory image are processed to acquire the depth information of the current scene.

Figure 8:
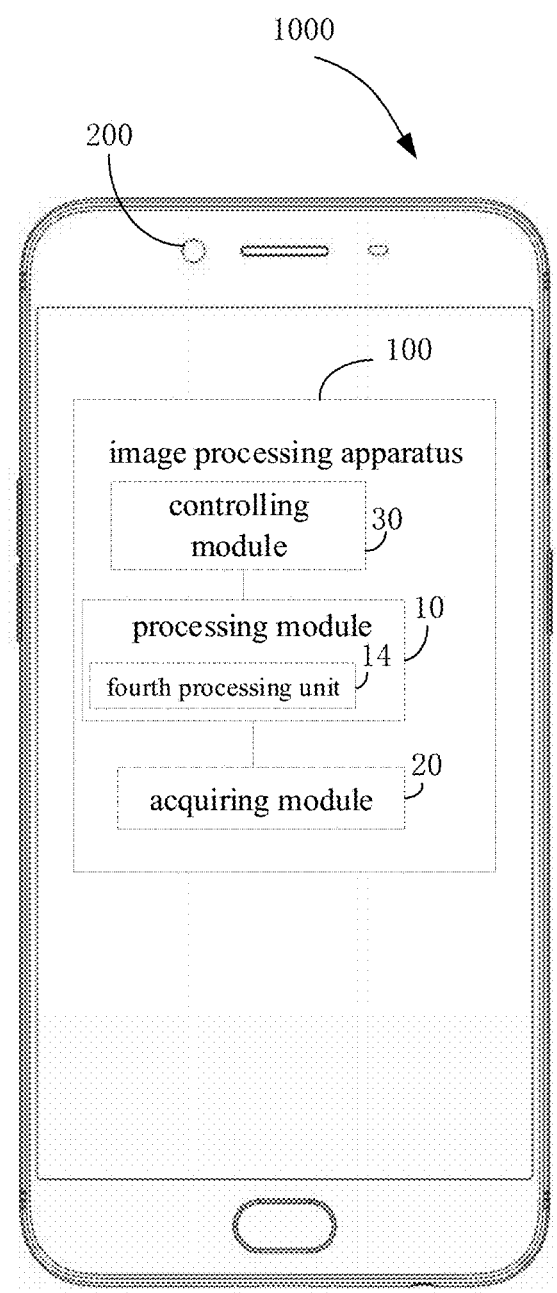
FIG. 8 is a block diagram illustrating an image processing apparatus according to some embodiments of the present disclosure.

Referring to FIG. 8, in some embodiments, the imaging apparatus 200 may include a single camera. The image processing apparatus 100 may include a controlling module 30. The act in block S30 may be implemented by the controlling module 30. The act in block S40 may be implemented by the controlling module 30. The act in block S50 may be implemented by the fourth processing unit 14. That is, the controlling module 30 is configured to control the camera to capture a current scene at a first location to acquire the cached main image; and control the camera to move from the first position to a second position along a direction perpendicular to an axial direction of the camera, and control the camera to capture the current scene at the second position to acquire the cached accessory image. The fourth processing unit 14 is configured to process the cached main image and the cached accessory image to acquire the depth information of the current scene.

Figure 9:
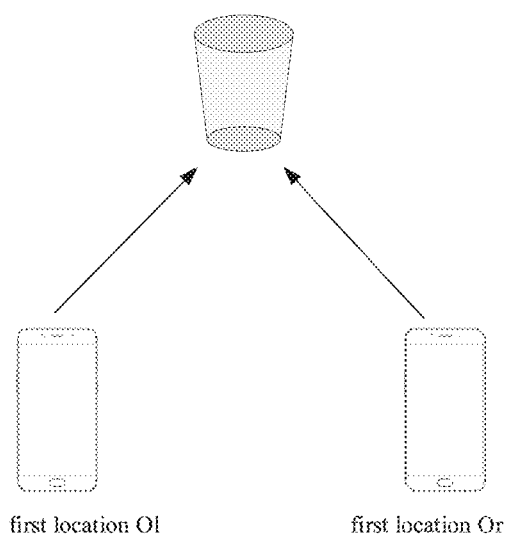
FIG. 9 is a schematic diagram illustrating states of an image processing method according to some embodiments of the present disclosure.
Figure 10:
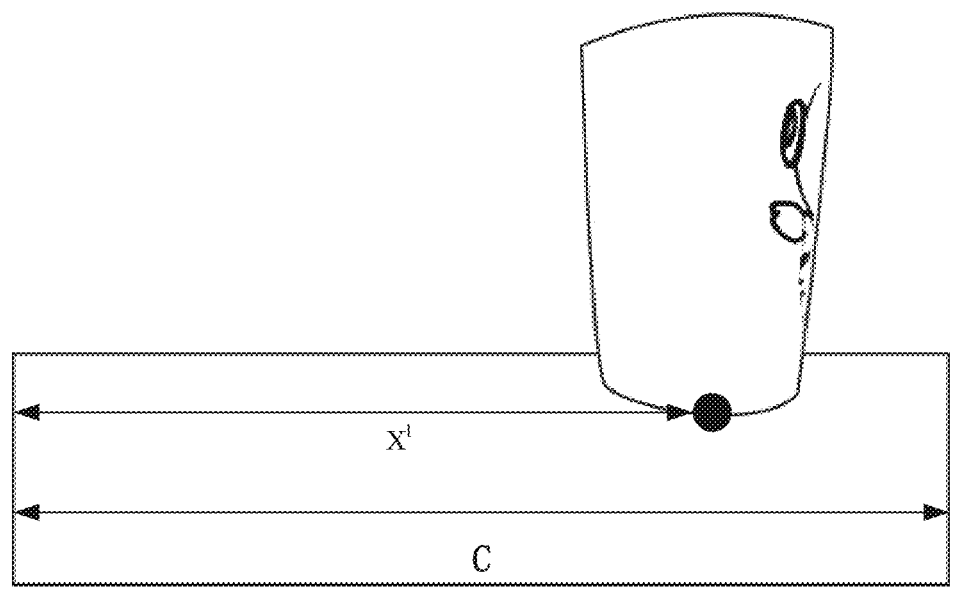
FIG. 10 is a schematic diagram illustrating states of an image processing method according to some embodiments of the present disclosure.
Figure 11:
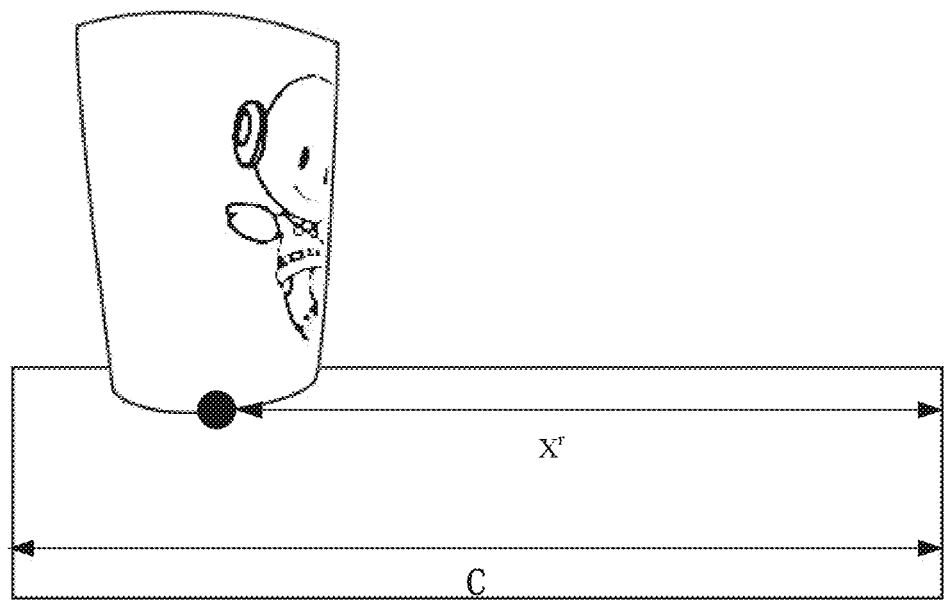
FIG. 11 is a schematic diagram illustrating states of an image processing method according to some embodiments of the present disclosure.

Referring to FIG. 9 to FIG. 11, $X^l$ represents a shortest distance from the midpoint of the bottom of the cup to the leftmost end of the image. $X^r$ represents a shortest distance from the midpoint of the bottom of the cup to the rightmost end of the image. C represents the width of the image. In detail, the cached main image is first captured at the first position Ol. Then the camera is moved to the second position Or to capture the cached accessory image. The direction of the connection line between the first position Ol and the second position Or is perpendicular to the axial direction of the camera. In this way, the stereo image pair of the cached main image and the cached accessory image may be acquired, and the stereo image pair may be processed to acquire the depth information of the current scene.

It should be noted that the axial direction of the camera refers to a direction parallel to the optical axis direction when the camera captures the current scene.

It should be understood that, it is difficult for the depth detection method based on binocular stereo vision to ensure that the specifications of the two cameras are completely consistent, and the relative position between the two cameras may be changed due to external factors such as the fall of the electronic device 1000, thereby affecting the accuracy of depth detection. The depth detection method based on the single camera is based on the movable single camera. On one hand, a relatively-matched stereo image pair may be acquired. On the other hand, the limitation of the relative position of the cameras when the stereo image pair is captured is small, and the degree of freedom for camera movement is large, thereby avoiding the problem of inaccurate depth detection caused by changes of relative position of the two cameras.

Figure 12:
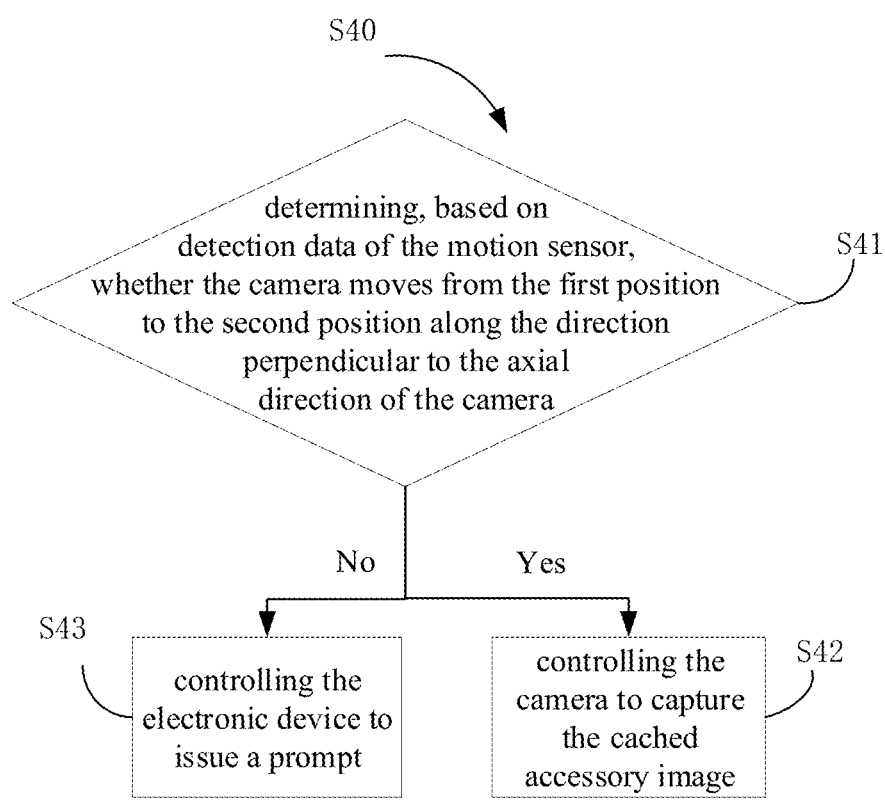
FIG. 12 is a flow chart illustrating an image processing method according to some embodiments of the present disclosure.

Referring to FIG. 12, in some embodiments, the electronic device may include a motion sensor. The act in block S40 may include acts in the following blocks.

At block S41, it is determined, based on detection data of the motion sensor, whether the camera moves from the first position to the second position along the direction perpendicular to the axial direction of the camera.

At block S42, the camera is controlled to capture the cached accessory when the camera moves from the first position to the second position along the direction perpendicular to the axial direction of the camera.

At block S43, the electronic device is controlled to issue a prompt when the camera does not move from the first position to the second position along the direction perpendicular to the axial direction of the camera.

Figure 13:
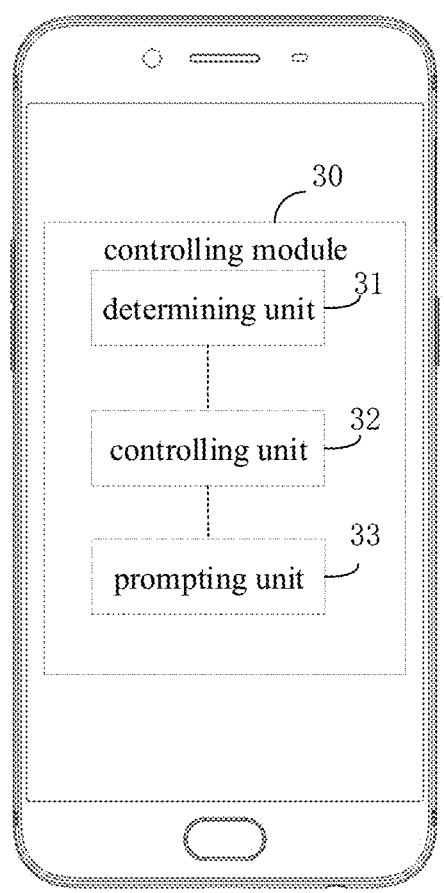
FIG. 13 is a block diagram illustrating an image processing apparatus according to some embodiments of the present disclosure.

Referring to FIG. 13, in some embodiments, the electronic device 1000 may include a motion sensor. The controlling module 30 includes a determining unit 31, a controlling unit 32, and a prompting unit 33. The act in block S41 may be implemented by the determining unit 31. The act in block S42 may be implemented by the controlling unit 32. The act in block S43 may be implemented by the prompting unit 33. That is, the determining unit 31 is configured to determine, based on detection data of the motion sensor, whether the camera moves from the first position to the second position along the direction perpendicular to the axial direction of the camera. The controlling unit 32 is configured to control the camera to capture the cached accessory when the camera moves from the first position to the second position along the direction perpendicular to the axial direction of the camera. The prompting unit 33 is configured to control the electronic device 1000 to issue a prompt when the camera does not move from the first position to the second position along the direction perpendicular to the axial direction of the camera.

In detail, a spatial Cartesian coordinate system X-Y-Z is established in the space in which the electronic device 1000 is located. In an embodiment of the present disclosure, the axial direction of the camera may be as the Y-axis direction of the spatial Cartesian coordinate system. The X-axis direction of the spatial Cartesian coordinate system is a first moving direction perpendicular to the axial direction of the camera. The Y-axis direction of the spatial Cartesian coordinate system is a second moving direction parallel to the axial direction of the camera. The Z-axis direction of the spatial Cartesian coordinate system is a third moving direction perpendicular to the axial direction of the camera. In order to keep the camera moving from the first position Ol along the direction perpendicular to the axial direction of the camera, the camera appears in the spatial Cartesian coordinate system to be in the X-axis direction, i.e., the first moving direction, or in the Z-axis direction, i.e., the third moving direction. In this way, two images taken at different positions are acquired to acquire a stereo image pair. The stereo image pair may be processed in a subsequent act to acquire depth information. If the moving direction of the camera is deviated from the X-axis direction or the Z-axis direction, the electronic device 1000 is required to issue a prompt message to remind the user to find the correct capturing position to ensure that a qualified stereo image pair is acquired.

In certain embodiments, the motion sensor includes a gyroscope or an acceleration sensor. It should be understood that the gyroscope may detect a deflection state of the electronic device 1000. The detection data of the gyroscope is configured to assist the user to correct the moving direction of the camera and determine the second position, to acquire the cached accessory image for a subsequent act of acquiring depth information.

In some embodiments, when the camera moves to the second position along the direction perpendicular to the axial direction of the camera, if the current scene is in motion, that is, the person or object in the current scene is moving, the cached accessory image captured by the camera may be blurred. In this way, matching pixels of the corresponding feature points in the blurred cached accessory image may not be recognized in the subsequent acts, so that the cached main image and the cached accessory image cannot be employed to acquire the depth information. Therefore, the capturing process is not performed while the current scene is in motion. If the current scene is not in motion, the camera is controlled to capture the current scene to acquire the cached accessory image.

Figure 14:
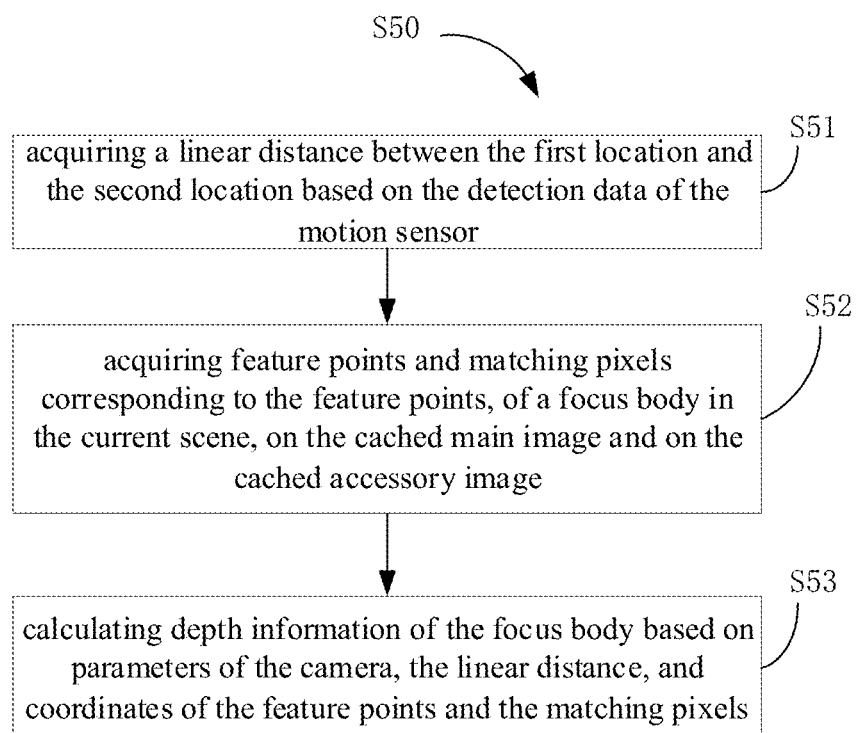
FIG. 14 is a flow chart illustrating an image processing method according to some embodiments of the present disclosure.
Figure 15:
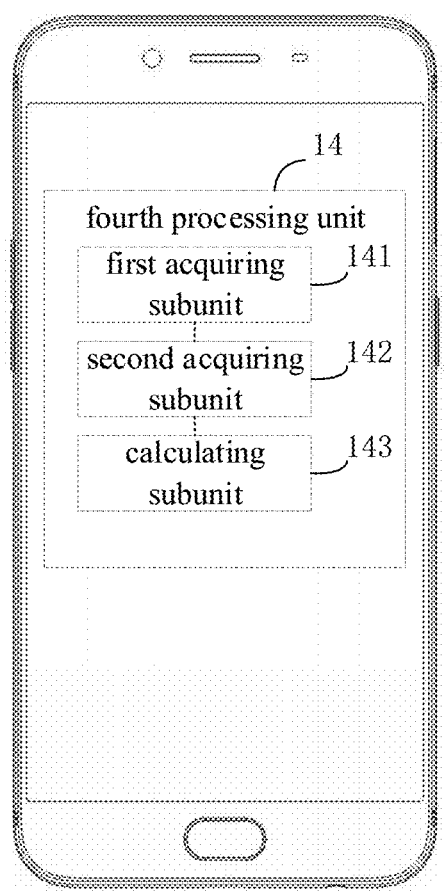
FIG. 15 is a block diagram illustrating an image processing apparatus according to some embodiments of the present disclosure.

Referring to FIG. 14, in some embodiments, the act in block S50 may include acts in the following blocks.

At block S51, a linear distance between the first location and the second location is acquired based on the detection data of the motion sensor.

At block S52, feature points and matching pixels corresponding to the feature points, of a focus body in the current scene, on the cached main image and on the cached accessory image are acquired.

At block S53, depth information of the focus body is calculated based on parameters of the camera, the linear distance, and coordinates of the feature points and matching pixels.

Referring to FIG. 14, in some embodiments, the fourth processing unit 14 includes a first acquiring subunit 141, a second acquiring subunit 142, and a calculating subunit 143. The act in block S51 may be implemented by the first acquiring subunit 141. The act in block S52 may be implemented by the second acquiring subunit 142. The act in block S53 may be implemented by the calculating subunit 143. That is, the first acquiring subunit 141 is configured to acquire a linear distance between the first location and the second location based on the detection data of the motion sensor. The second acquiring subunit 142 is configured to acquire feature points and matching pixels corresponding to the feature points, of a focus body in the current scene, on the cached main image and on the cached accessory image. The calculating subunit 143 is configured to calculate depth information of the focus body based on parameters of the camera, the linear distance, and coordinates of the feature points and the matching pixels.

Figure 16:
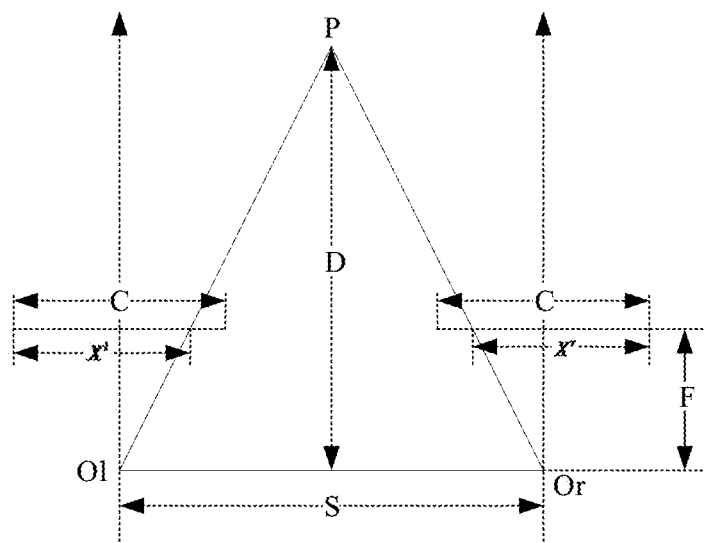
FIG. 16 is a schematic diagram illustrating states of an image processing method according to some embodiments of the present disclosure.

Referring to FIG. 10, FIG. 11, and FIG. 16, the moving direction of the camera is along the X-axis direction for translating. In FIG. 16, P is a certain pixel point of the focus body that the user pays attention to in the current scene. F is the focal length of the camera when the main image is cached and the accessory image is cached. It should be understood that, the depth information corresponding to the current scene may include depth information of a plurality of pixel points, i.e., the depth information of the plurality of pixel points needs to be acquired to acquire the depth information of the current scene. In addition, when the camera is in the first position Ol and the second position Or, respective frames of the viewfinder of the camera are substantially the same. That is, when the camera is in the first position Ol, the focus body of the current scene is located in the camera, and when the camera is in the second position Or, the focus body of the current scene is also located in the camera. Therefore, the feature point recognition and the matching of the pixels corresponding to the feature points are performed on the cached main image and the cached accessory image. The feature point is a feature point of the focus body that the user pays attention to in the current scene, for example, the midpoint of the bottom of the cup in the cached main image of FIG. 10, and the midpoint of the bottom of the cup in the cached accessory image of FIG. 11. The pixels corresponding to the midpoints of the bottom of the cup in the two images may be the matching pixels. Then, the depth information of each matching pixel is calculated based on parameters of the camera, the linear distance S, and the coordinates of the recognized feature points and matching pixels. In detail, the linear distance S between the first position Ol and the second position Or may be acquired based on the detection data of the motion sensor, and then the depth information D of the matching pixel corresponding to a certain feature point in the image may be calculated based on the linear distance S. The depth information D is calculated by a formula of:

$$D = \frac{SF}{X^l + X^r - C}.$$

In this way, after the depth information D of each matching pixel in the current scene is calculated by using the above calculation formula, the matching pixels having the depth information may be employed to form the depth information corresponding to the current scene.

In other embodiments, the camera may also be moved from the first position along the Z-axis direction to the second position. Subsequently, the depth information is still calculated based on the linear distance S between the first position and the second position, the parameters of the camera, and the coordinates of the feature points and the matching pixels.

Figure 17:
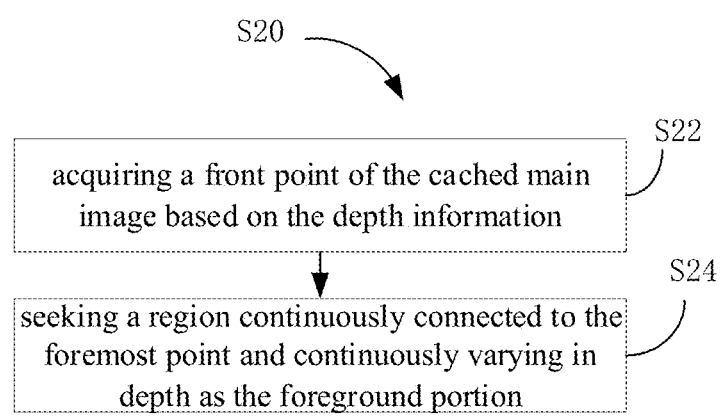
FIG. 17 is a flow chart illustrating an image processing method according to some embodiments of the present disclosure.

Referring to FIG. 17, in some embodiments, the act in block S20 may include acts in the following blocks.

At block S22, a front point of the cached main image is acquired based on the depth information.

At block S24, a region continuously connected to the foremost point and continuously varying in depth is sought as the foreground portion.

Figure 18:
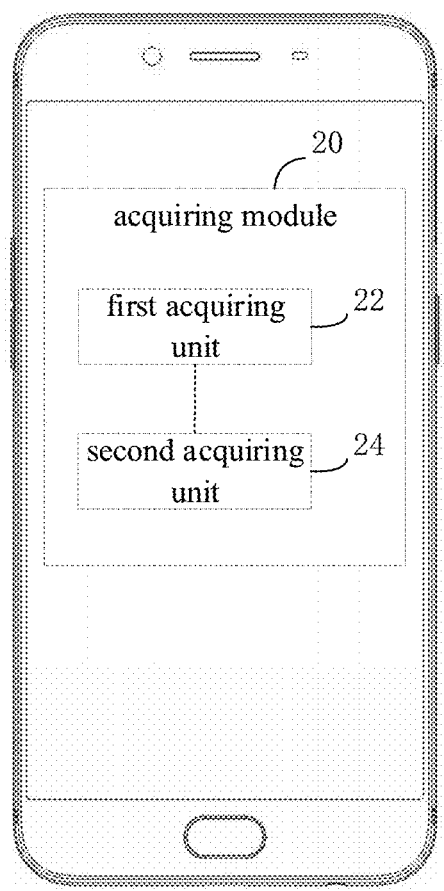
FIG. 18 is a block diagram illustrating an image processing apparatus according to some embodiments of the present disclosure.

Referring to FIG. 18, in some embodiments, the acquiring module 20 includes a first acquiring unit 22 and a second acquiring unit 24. The act in block S22 may be implemented by the first acquiring unit 22. The act in block S24 may be implemented by the second acquiring unit 24. That is, the first acquiring unit 22 is configured to acquire a front point of the cached main image based on the depth information. The second acquiring unit 24 is configured to acquire seek a region continuously connected to the foremost point and continuously varying in depth as the foreground portion.

In this way, the foreground portion of the physical connection of the cached main image may be acquired. That is, in the real scene, the foreground portion may be continuous physically. Taking the foreground portion of the physical connection as the main body, the relationship of the foreground portion may be intuitively acquired.

In detail, the depth of each pixel in the cached main image is acquired based on the depth information, the pixel with the smallest depth is acquired as the foremost point of the cached main image, and the foremost point is equivalent to the beginning of the foreground portion. Spreading from the foremost front, the areas where the foremost point is continuously connected, and the depth is continuously changed, are acquired, and these areas and the foremost point are merged into the foreground area.

It should be noted that the foremost point refers to a pixel point corresponding to the object with the smallest depth, i.e., a pixel point corresponding to the object with the smallest distance or closest to the imaging apparatus 200. Adjacency means that two pixels are connected together. When the depth continuously changes, the depth difference between two adjacent pixel points is smaller than a predetermined difference, or the depth of two adjacent pixel points whose difference in depth is smaller than a predetermined difference continuously changes.

In some embodiments, a region that is less than a predetermined threshold from the depth of the foremost point may also be sought as the foreground portion. In this way, the foreground portion of the logical connection of the cached main image may be acquired. In the real scene, the foreground portion may not be continuous physically, but it is in a certain logical relationship, such as the scene where the eagle swoops down to catch the chicken, the eagle and the chick are not connected physically together. However, logically, they may be connected.

In detail, the front point of the cached main image is acquired based on the depth information, and the foremost point is equivalent to the beginning of the foreground portion. It is diffused from the foremost point to acquire an area where the difference from the depth of the foremost point is less than a predetermined threshold, and these areas are merged with the foremost point as the foreground area In some examples, the predetermined threshold may be a value set by the user. In this way, the user may determine the range of the foreground portion based his/her needs. In other examples, the predetermined threshold may be a value determined by the image processing apparatus 100. The predetermined threshold is not limited herein. The predetermined threshold determined by the image processing apparatus 100 may be a fixed value stored internally, or may be a value calculated based on different situation, such as the depth of the foremost point.

In some embodiments, it is also possible to seek a region of depth in the appropriate range as the foreground portion. Understandably, in some capturing situations, the foreground portion is not the front portion, but the portion that is slightly behind the front portion. For example, a person sitting behind a computer, the computer is relatively front, but the person is the main portion, so the area where the depth is in the predetermined interval is taken as the foreground portion, effectively avoiding the problem that the main body selection is incorrect.

Figure 19:
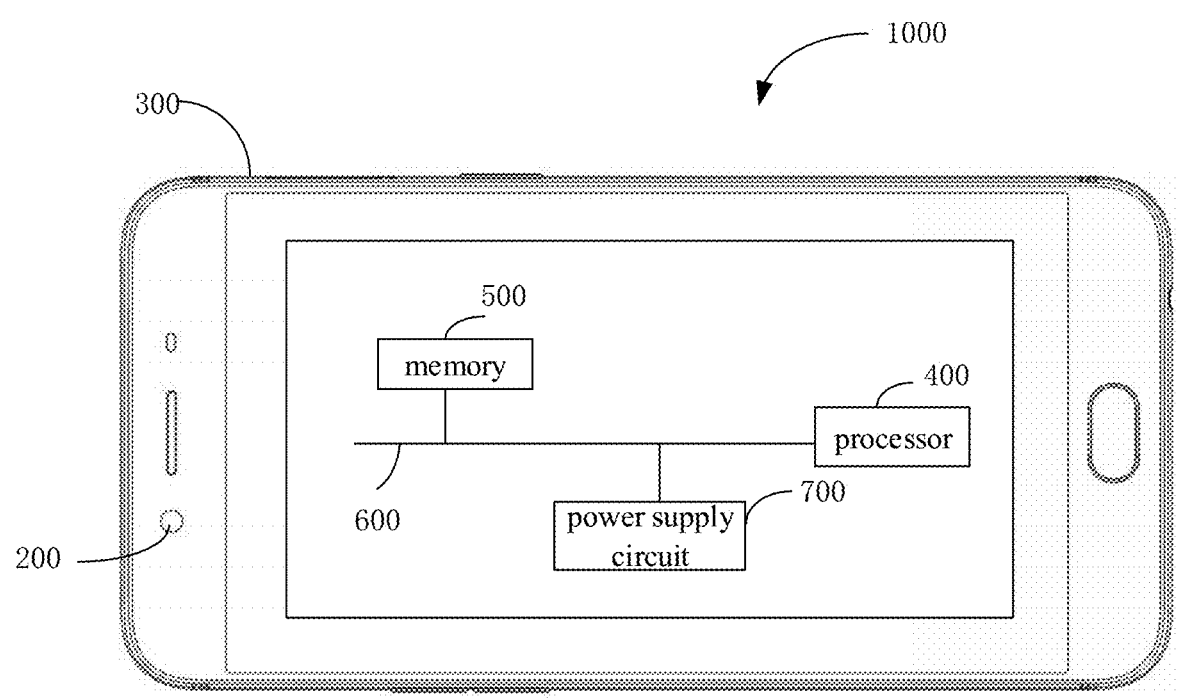
FIG. 19 is a block diagram illustrating an electronic device according to some embodiments of the present disclosure.

Referring to FIG. 19, an electronic device 1000 of the embodiment of the present disclosure may include a housing 300, a processor 400, a memory 500, a circuit board 600, and a power supply circuit 700. The circuit board 600 is disposed inside a space enclosed by the housing 300. The processor 400 and the memory 500 are disposed on the circuit board 600. The power supply circuit 700 is configured to supply power to each circuit or apparatus of the electronic device 1000. The memory 500 is configured to store executable program codes. The processor 400 is configured to read the executable program codes stored in the memory 500 to execute a program corresponding to the executable program codes for performing the image processing method of any one of the embodiments of the present disclosure. In the process of processing the image, the processor 400 is configured to perform the following acts: processing the scene data to acquire depth information of the cached main image; and acquiring a foreground portion of the cached main image based on the depth information.

In some embodiment, the processor 400 is configured to perform the following acts: processing the depth image to acquire depth data of the cached main image; processing the depth data to acquire the depth information; and acquiring a foreground portion of the cached main image based on the depth information.

In some embodiment, the processor 400 is configured to perform the following acts: processing the cached main image and the cached accessory image to acquire depth data of the cached main image; processing the depth data to acquire the depth information; and acquiring a foreground portion of the cached main image based on the depth information.

In some embodiment, the processor 400 is configured to perform the following acts: processing the scene data to acquire depth information of the cached main image; acquiring a front point of the cached main image based on the depth information; and seeking a region continuously connected to the foremost point and continuously varying in depth as the foreground portion.

It should be noted that the foregoing description of the image processing method and the image processing apparatus 100 is also applicable to the electronic device 1000 of the embodiment of the present disclosure, and details are not described herein again.

The computer readable storage medium provided in the embodiment of the present disclosure has instructions stored therein. When the processor 400 of the electronic device 1000 executes the instructions, the electronic device 1000 performs the image processing method according to an embodiment of the present disclosure. The foregoing description of the image processing method and the image processing apparatus 100 is also applicable to the computer readable storage medium of the embodiment of the present disclosure, and details are not described herein again.

In conclusion, with the electronic device 1000 and the computer readable storage medium provided in the embodiments of the present disclosure, the depth information of the image is acquired by processing the scene data of the imaging apparatus, and the foreground portion of the image is recognized based on the depth information. The foreground portion is generally employed as the main body of the image, which provides convenience for the user to process the image and improves the user experience on one hand. On the other hand, the main body of the processed image may be more prominent, and the visual effect may be improved.

Reference throughout this specification to "an embodiment," "some embodiments," "one embodiment", "another example," "an example," "a specific example," or "some examples," means that a particular feature, structure, material, or characteristic described in connection with the embodiment or example is included in at least one embodiment or example of the present disclosure. Thus, the appearances of the phrases such as "in some embodiments," "in one embodiment", "in an embodiment", "in another example," "in an example," "in a specific example," or "in some examples," in various places throughout this specification are not necessarily referring to the same embodiment or example of the present disclosure. Furthermore, the particular features, structures, materials, or characteristics may be combined in any suitable manner in one or more embodiments or examples.

In addition, terms such as "first" and "second" are used herein for purposes of description and are not intended to indicate or imply relative importance or significance. Furthermore, the feature defined with "first" and "second" may comprise one or more this feature distinctly or implicitly. In the description of the present disclosure, "a plurality of" means two or more than two, unless specified otherwise.

Any process or method described in a flow chart or described herein in other ways may be understood to include one or more modules, segments or portions of codes of executable instructions for achieving specific logical functions or steps in the process, and the scope of a preferred embodiment of the present disclosure includes other implementations, which should be understood by those skilled in the art.

The logic and/or step described in other manners herein or shown in the flow chart, for example, a particular sequence table of executable instructions for realizing the logical function, may be specifically achieved in any computer readable medium to be used by the instruction execution system, device or equipment (such as the system based on computers, the system comprising processors or other systems capable of acquiring the instruction from the instruction execution system, device and equipment and executing the instruction), or to be used in combination with the instruction execution system, device and equipment. As to the specification, "the computer readable medium" may be any device adaptive for including, storing, communicating, propagating or transferring programs to be used by or in combination with the instruction execution system, device or equipment. More specific examples of the computer readable medium comprise but are not limited to: an electronic connection (an electronic device) with one or more wires, a portable computer enclosure (a magnetic device), a random access memory (RAM), a read only memory (ROM), an erasable programmable read-only memory (EPROM or a flash memory), an optical fiber device and a portable compact disk read-only memory (CDROM). In addition, the computer readable medium may even be a paper or other appropriate medium capable of printing programs thereon, this is because, for example, the paper or other appropriate medium may be optically scanned and then edited, decrypted or processed with other appropriate methods when necessary to acquire the programs in an electric manner, and then the programs may be stored in the computer memories.

It should be understood that each part of the present disclosure may be realized by the hardware, software, firmware or their combination. In the above embodiments, a plurality of steps or methods may be realized by the software or firmware stored in the memory and executed by the appropriate instruction execution system. For example, if it is realized by the hardware, likewise in another embodiment, the steps or methods may be realized by one or a combination of the following techniques known in the art: a discrete logic circuit having a logic gate circuit for realizing a logic function of a data signal, an application-specific integrated circuit having an appropriate combination logic gate circuit, a programmable gate array (PGA), a field programmable gate array (FPGA), etc.

Those skilled in the art shall understand that all or parts of the steps in the above exemplifying method of the present disclosure may be achieved by commanding the related hardware with programs. The programs may be stored in a computer readable storage medium, and the programs comprise one or a combination of the steps in the method embodiments of the present disclosure when run on a computer.

In addition, each function cell of the embodiments of the present disclosure may be integrated in a processing module, or these cells may be separate physical existence, or two or more cells are integrated in a processing module. The integrated module may be realized in a form of hardware or in a form of software function modules. When the integrated module is realized in a form of software function module and is sold or used as a standalone product, the integrated module may be stored in a computer readable storage medium.

The storage medium mentioned above may be read-only memories, magnetic disks or CD, etc. Although explanatory embodiments have been shown and described, it would be appreciated by those skilled in the art that the above embodiments cannot be construed to limit the present disclosure, and changes, alternatives, and modifications can be made in the embodiments without departing from spirit, principles and scope of the present disclosure.

What is claimed is:

1. A method for image processing, wherein a first cached image is acquired by capturing a current scene through an imaging apparatus of an electronic device, wherein the imaging apparatus comprises one camera, wherein the electronic device comprises an image processing apparatus and a motion sensor, wherein the image processing apparatus comprises a controlling module, and wherein the method for image processing comprises:

controlling, by the controlling module, the camera to capture the current scene at a first position to acquire the first cached image;

controlling, by the controlling module, the camera to move from the first position to a second position along a direction perpendicular to an axial direction of the camera;

determining, based on detection data of the motion sensor, whether the camera moves from the first position to the second position along the direction perpendicular to the axial direction of the camera;

in response to determining that the camera moves from the first position to the second position along the direction perpendicular to the axial direction of the camera, controlling, by the controlling module, the camera to capture the current scene at the second position to acquire the second cached image; processing the first cached image and the second cached image to acquire depth information; and acquiring a foreground portion of the first cached image based on the depth information; and in response to determining that the camera does not move from the first position to the second position along the direction perpendicular to the axial direction of the camera, controlling the electronic device to issue a prompt.

2. The method of claim 1, wherein processing the first cached image and the second cached image to acquire the depth information comprises:

acquiring a linear distance between the first position and the second position based on the detection data of the motion sensor;

acquiring feature points and matching pixels corresponding to the feature points of a focus body in the current scene on the first cached image and on the second cached image; and calculating depth information of the focus body based on parameters of the camera, the linear distance, and coordinates of the feature points and the matching pixels.

3. The method of claim 1, wherein acquiring the foreground portion of the first cached image based on the depth information comprises:

acquiring a front point of the first cached image based on the depth information; and seeking a region continuously connected to a foremost point and continuously varying in depth as the foreground portion.

4. The method of claim 1, further comprising:

determining whether the current scene is in motion when the camera moves to the second position;

wherein controlling, by the controlling module, the camera to capture the current scene at the second position to acquire the second cached image comprises: controlling, by the controlling module, the camera to capture the current scene at the second position to acquire the second cached image in response to determining that the current scene is in motion.

5. An electronic device, comprising:

a motion sensor;

an imaging apparatus configured to capture a current scene to acquire a first cached image and comprising one camera;

a memory configured to store executable program codes;

an image processing apparatus comprising a controlling module configured to read the executable program codes stored in the memory to execute a program corresponding to the executable program codes for performing:

controlling the camera to capture the current scene at a first position to acquire the first cached image;

controlling the camera to move from the first position to a second position along a direction perpendicular to an axial direction of the camera;

determining, based on detection data of the motion sensor, whether the camera moves from the first position to the second position along the direction perpendicular to the axial direction of the camera;

controlling the camera to capture the current scene at the second position to acquire the second cached image when the camera moves from the first position to the second position along the direction perpendicular to the axial direction of the camera; and controlling the electronic device to issue a prompt when the camera does not move from the first position to the second position along the direction perpendicular to the axial direction of the camera; and a processor configured to read the executable program codes stored in the memory to execute a program corresponding to the executable program codes for performing:

processing the first cached image and the second cached image to acquire depth information; and acquiring a foreground portion of the first cached image based on the depth information.

6. The electronic device of claim 5, wherein processing the first cached image and the second cached image to acquire the depth information comprises:

acquiring a linear distance between the first position and the second position based on the detection data of the motion sensor;

acquiring feature points and matching pixels corresponding to the feature points, of a focus body in the current scene, on the first cached image and on the second cached image; and calculating depth information of the focus body based on parameters of the camera, the linear distance, and coordinates of the feature points and the matching pixels.

7. The electronic device of claim 5, wherein acquiring the foreground portion of the first cached image based on the depth information comprises:

acquiring a front point of the first cached image based on the depth information; and seeking a region continuously connected to a foremost point and continuously varying in depth as the foreground portion.

8. The electronic device of claim 5, wherein the processor is further configured to read the executable program codes stored in the memory to execute a program corresponding to the executable program codes for performing:

determining whether the current scene is in motion when the camera moves to the second position;

wherein controlling the camera to capture the current scene at the second position to acquire the second cached image comprises: controlling the camera to capture the current scene at the second position to acquire the second cached image in response to determining that the current scene is in motion.

9. A non-transitory computer readable storage medium having stored therein instructions that, when executed by a processor of an electronic device, causes the electronic device to perform an image processing method, wherein a first cached image is acquired by capturing a current scene through an imaging apparatus of the electronic device, wherein the imaging apparatus comprises one camera, wherein the electronic device comprises an image processing apparatus and a motion sensor, wherein the image processing apparatus comprises a controlling module, and wherein the image processing method comprises:

controlling, by the controlling module, the camera to capture the current scene at a first position to acquire the first cached image;

controlling, by the controlling module, the camera to move from the first position to a second position along a direction perpendicular to an axial direction of the camera;

determining, based on detection data of the motion sensor, whether the camera moves from the first position to the second position along the direction perpendicular to the axial direction of the camera;

in response to determining that the camera moves from the first position to the second position along the direction perpendicular to the axial direction of the camera, controlling, by the controlling module, the camera to capture the current scene at the second position to acquire the second cached image; processing the first cached image and the second cached image to acquire depth information; and acquiring a foreground portion of the first cached image based on the depth information; and in response to determining that the camera does not move from the first position to the second position along the direction perpendicular to the axial direction of the camera, controlling the electronic device to issue a prompt.

10. The non-transitory computer readable storage medium of claim 9, wherein acquiring the foreground portion of the first cached image based on the depth information comprises:

acquiring a front point of the first cached image based on the depth information; and seeking a region continuously connected to a foremost point and continuously varying in depth as the foreground portion.

11. The non-transitory computer readable storage medium of claim 9, wherein processing the first cached image and the second cached image to acquire the depth information comprises: acquiring a linear distance between the first position and the second position based on the detection data of the motion sensor; acquiring feature points and matching pixels corresponding to the feature points of a focus body in the current scene on the first cached image and on the second cached image; and calculating depth information of the focus body based on parameters of the camera, the linear distance, and coordinates of the feature points and the matching pixels.

12. The non-transitory computer readable storage medium of claim 9, wherein the method further comprises:

determining whether the current scene is in motion when the camera moves to the second position;

wherein controlling, by the controlling module, the camera to capture the current scene at the second position to acquire the second cached image comprises: controlling, by the controlling module, the camera to capture the current scene at the second position to acquire the second cached image in response to determining that the current scene is in motion.

* * * * *